(12) United States Patent
Morgan et al.

(10) Patent No.: US 10,475,019 B2
(45) Date of Patent: Nov. 12, 2019

(54) MOBILE DEVICE OPERATING AS A BEACON DEVICE

(71) Applicants: Taylor Drake Morgan, New York, NY (US); Eric Josef Goetschalckx, Atlanta, GA (US); Andrew Colton Smith, Atlanta, GA (US); Ethan Michael Edgerton, Atlanta, GA (US)

(72) Inventors: Taylor Drake Morgan, New York, NY (US); Eric Josef Goetschalckx, Atlanta, GA (US); Andrew Colton Smith, Atlanta, GA (US); Ethan Michael Edgerton, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 603 days.

(21) Appl. No.: 14/529,733

(22) Filed: Oct. 31, 2014

(65) Prior Publication Data
US 2016/0125389 A1     May 5, 2016

(51) Int. Cl.
| | | |
|---|---|---|
| *G06Q 20/32* | (2012.01) | |
| *G06Q 30/04* | (2012.01) | |
| *H04W 40/24* | (2009.01) | |
| *H04W 4/029* | (2018.01) | |
| *H04W 4/80* | (2018.01) | |

(52) U.S. Cl.
CPC ....... *G06Q 20/3224* (2013.01); *G06Q 20/327* (2013.01); *G06Q 30/04* (2013.01); *H04W 4/029* (2018.02); *H04W 4/80* (2018.02); *H04W 40/244* (2013.01)

(58) Field of Classification Search
CPC .. G06Q 20/32; G06Q 20/3224; G06Q 20/327; G06C 20/3224
USPC ........................................................... 705/40
See application file for complete search history.

(56) References Cited

U.S. PATENT DOCUMENTS

| | | | | |
|---|---|---|---|---|
| 8,498,900 B1 * | 7/2013 | Spirin | .................... | G06Q 50/00 340/286.09 |
| 2016/0092864 A1 * | 3/2016 | Evans | .................... | G06Q 20/14 705/40 |

* cited by examiner

*Primary Examiner* — Robert R Niquette
*Assistant Examiner* — Liz P Nguyen
(74) *Attorney, Agent, or Firm* — Schwegman, Lundberg & Woessner (57) ABSTRACT

Various embodiments each include at least one of systems, methods, devices, and software for operating mobile devices as beacon devices. One embodiment in the form of a method includes retrieving data, from a backend system by a mobile device app that executes on a first mobile device, of an open bill associated in the backend system with a first customer account. This method further includes receiving a radio signal via a transceiver of the mobile device. The radio signal in such embodiments includes an identifier encoded therein. The method also includes transmitting the identifier encoded in the received radio signal to the backend system to associate a second customer account with the open bill in the backend system, the second customer account associated with the identifier.

11 Claims, 5 Drawing Sheets

MOBILE DEVICE OPERATING AS A BEACON DEVICE

BACKGROUND INFORMATION

Radio beacons, such as BLUETOOTH® beacon devices, are gaining popularity in many settings. Such beacon devices are used to enable mobile devices to obtain data from which a current location can be determined relative to either one or more known locations or an actual location with a certain degree of accuracy. Beacon devices may also be deployed to enable "mobile pay" payments from mobile devices and may be deployed such that their positioning capabilities may be leveraged for several purposes. In some circumstance, to accomplish some of these purposes and to enable beacon device utilization and associated functionality, beacon devices are deployed to locations where electricity is not available. For example, a restaurant may desire to deploy a beacon device at each dining table where few if any dining tables have a proximate electricity outlet. Battery powered beacon devices may be deployed in such circumstances, but the batteries require recharging. Recharging beacon device batteries requires additional effort to properly maintain the beacon device deployment, can be prone to error in returning each beacon device to their proper locations, and can contribute to poor system performance. Poor system performance can lead to unreliability and customer frustration and slow and modest use adoption.

SUMMARY

Various embodiments each include at least one of systems, methods, devices, and software for operating mobile devices as beacon devices.

One embodiment in the form of a method includes retrieving data, from a backend system by a mobile device app that executes on a first mobile device, of an open bill associated in the backend system with a first customer account. This method further includes receiving a radio signal via a transceiver of the mobile device. The radio signal in such embodiments includes an identifier encoded therein. The method also includes transmitting the identifier encoded in the received radio signal to the backend system to associate a second customer account with the open bill in the backend system, the second customer account associated with the identifier.

Another method of some embodiments includes receiving, from a mobile device app that executes on a first mobile device, data with regard to a first customer account associated with an open bill at a facility. The received data typically includes an identifier and an indication to associate a second customer account with at least a portion of the open bill. The second customer account is identifiable based on the identifier in such embodiments. The method further includes identifying the second customer account based on the identifier and associating the open bill to the second customer account. The method, in some embodiments, may then transmit a confirmation to the mobile device app that executes on the first mobile device confirming the associating was successful.

One system embodiment includes at least one network interface device, a transceiver, at least one processor, and at least one memory. The at least one memory stores an instruction set that is executable by the at least one processor to perform data processing activities. The data processing activities include retrieving data via the at least one network interface device from a backend system of an open bill associated in the backend system with a first customer account. The data processing activities also include receiving a radio signal via the transceiver including an identifier encoded therein and transmitting, via the at least one network interface device, the identifier to the backend system to associate a second customer account with the open bill in the backend system, the second customer account associated with the identifier.

DETAILED DESCRIPTION

Various embodiments each include at least one of systems, methods, devices, and software for operating mobile devices as beacon devices, such as in place of or augmenting a deployment of BLUETOOTH® beacon devices.

Such beacon devices may be deployed to enable mobile devices to communicate with other systems in a manner that informs the other systems of their location or to trigger performance of certain functionality, such as making mobile payments, checking in a customer at a restaurant, hospital, or clinic, and other functionality. The other systems may then perform various functions based on that location and some of those functions may be performed with specific regard to a customer account identified in data also transmitted to the other system, such as a payment function or providing a location-specific coupon among other functions. Beacon devices require a power source to operate. However, in some settings the availability of power sources may be limited or may not be available in locations where a beacon device may be desired. Further, regardless of the facility, customers may desire to utilize beacon device enabled solutions at locations where beacon devices are not, and even cannot, be deployed.

The various embodiments herein provide solutions to these are other confounds to beacon device deployment and utilization by enabling mobile devices to also operate as beacon devices. Such embodiments leverage the presence of transceivers in mobile devices, such as BLUETOOTH® transceivers.

For example, a first customer mobile device having an app executing thereon may be associated with a specific transaction at facility, such as a restaurant or other retail outlet. A second customer may desire to pay for all or a portion of the transaction. The second customer also possesses a mobile device having an app that executes thereon. The mobile device app of the first customer may then listen for a radio beacon signal broadcast from the transceiver of the mobile device of the second customer. The received radio beacon signal includes an identifier encoded therein, such as a Media Access Control (MAC) address of the broadcasting transceiver. That MAC address is associated in customer account data of the second customer in a backend system. The mobile device app of the first customer, upon receipt of the radio beacon signal, then relays the identifier to the backend system, via a network such as the Internet, with additional data, such as an identifier of the transaction. Upon receipt of the identifiers of the mobile device of the second customer and the transaction, the backend system then associates the second customer with the transaction. A confirmation may then be transmitted by the backend system, again via the network, to one or both of the mobile device apps of the first and second customers. At this point, or prior in the process, one or both of the first and second customers may input a portion of the transaction for which they are going to pay. The transaction may be paid for at that time or later, such as when one or both of the first and second customers depart the facility. In some embodiments, departure from the facility may be determined based on receipt of beacon device signals received by one or both mobile devices of the first and second customers or lack of receipt of such signals, such as after a particular period elapsing.

In these and some other embodiments, a mobile device app of one customer may operate passively as a beacon device. For example, when a location of a mobile device is known in the backend system, the mobile device app may execute in the background to report identifiers included in received radio signals. The mobile device location may be determined based on receipt of beacon device signals, global positioning system (GPS) location from a GPS device of the mobile device, Wireless Access Point (WAP) signals, or even user input that is transmitted to the backend system. The received radio signals are transmitted by other mobile devices, such as by their BLUETOOTH® transceivers while the BLUETOOTH® functionality is turned on. These broadcast signals typically include an identifier that is unique to the transceiver device, such as a MAC address. When the MAC address is associated with a customer account stored in the backend system, the mobile device simply relaying received MAC addresses, and optionally a varying signal strength of the received signal including the MAC address, the backend system is then aware of the approximate location of the customer of the customer account associated with the MAC address. Thus, customer mobile device may be enabled via a mobile device app to passively capture and relay data of received signals to assist in a successful beacon device deployment.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices.

Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
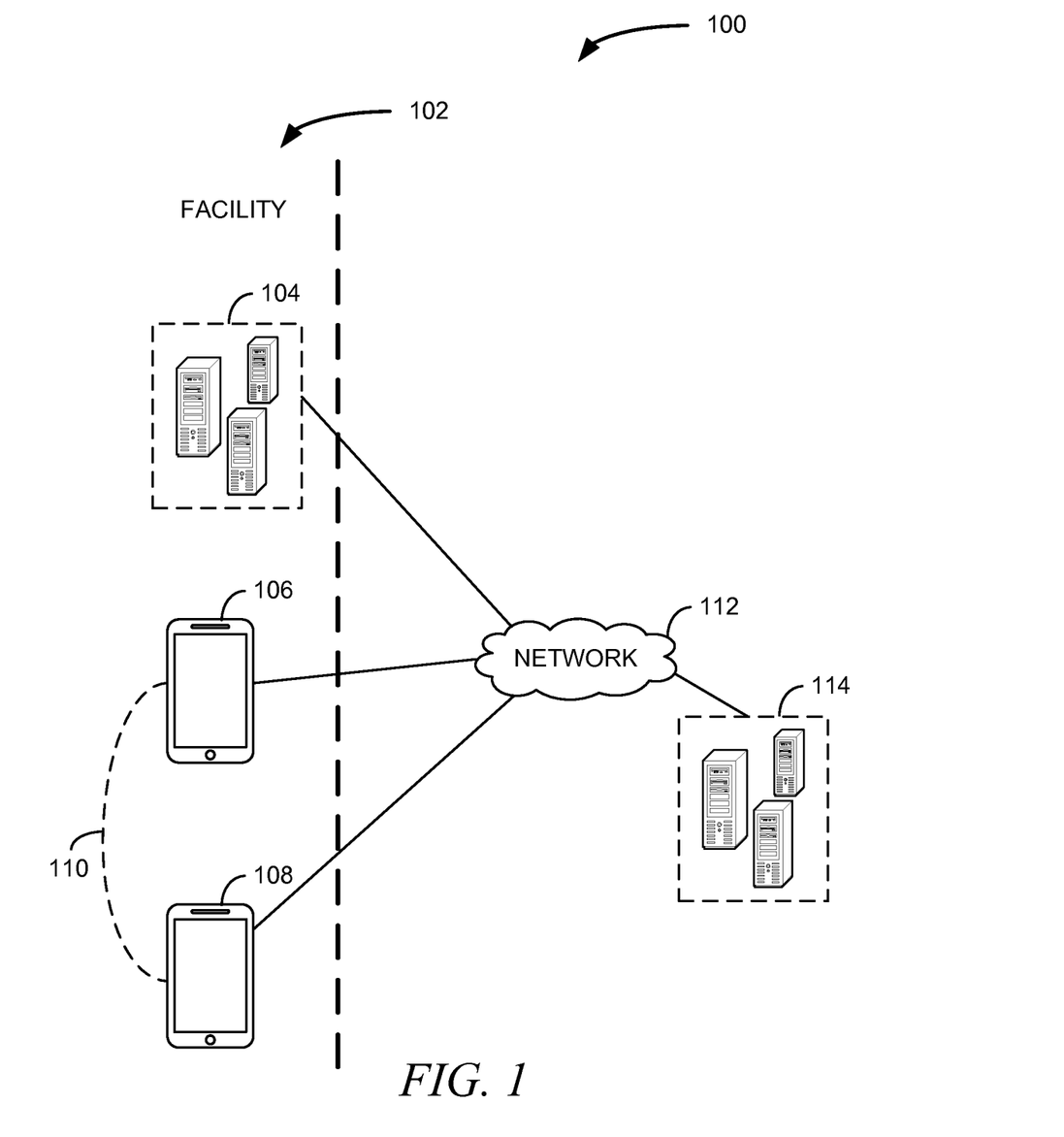
FIG. 1 is a logical block diagram of a system, according to an example embodiment.

FIG. 1 is a logical block diagram of a system 100, according to an example embodiment. The system 100 is a simplified illustration that includes two mobile devices 106, 108 located within a facility 102. The facility 120 also includes a computing system 104, such as a transaction processing system or store management system that may include transaction processing, inventory, ordering, and other functionality. Each of the mobile devices 106, 108 and the computing system 104 connect to a network 112, such as the Internet. Also connected to the Internet is a backend system 114. The backend system 114 is a generalized representation of a computing system that maintains customer account data and may perform other functions with regard to the facility 102, other facilities, beacon device deployment functionality and configuration, and the like.

The mobile devices 106, 108 may individually be one of a smartphone, a smartwatch, a tablet, a laptop computer, and other such computing devices that include a transceiver device, such as a BLUETOOTH® transceiver. Each of the mobile devices 106, 108 typically includes an app that executes thereon. However, some or all of the mobile device functionality may also or alternatively be a part of operating software of one or more device types, such as an operating system and other platform layer software (i.e., BIOS). Thus, when reference is made to a mobile device app herein, this is not intended to limit the scope of the disclosure but should be considered more broadly.

In some embodiments, the mobile device 106 is present in the facility 102. An app on the mobile device 106 transmits data to the backend system 114 that indicates it is within the facility, such as a beacon device identifier encoded in a radio signal received by the mobile device 106. The mobile device 106 is also associated with a customer account maintained in the backend system 114.

The mobile device 106 app in some embodiments may be utilized to enable another mobile device 108 customer account holder to pay for all or a portion of an open bill at the facility associated with the mobile device 106 customer account holder. For example, the open bill may be associated with the customer account of the mobile device 106 user by entering a transaction identifier of the open bill or other data within the mobile device 106 app. In other instances, wait staff or other facility personnel may enter data into their own mobile device or other system, such as a point of sale system, to associate the open bill with the customer account of the mobile device 106 user. Regardless of how associated, the mobile device 106 may then receive a radio signal 110 from a transceiver of the mobile device 110. The radio signal 110 typically includes an encoded identifier that is unique to the mobile device, a component therein such as the transceiver device, or to a customer account of the mobile device 108 user. This identifier may be a MAC address, a universally unique identifier (UUID) of the mobile device 108 or operating system software present thereon, a globally unique identifier (GUID), a customer account identifier, and the like. The mobile device 106 may then relay this identifier to the backend system 114 and the backend system 114 may then associate a customer account of the mobile device 108 user with the open bill based on the identifier that is stored with or in association with data of the customer account. This process is typically initiated by one or both of the mobile devices 106, 108 users based on input received into one or both of their apps. Once the backend system 114 associates the customer account with the bill, a confirmation message may be sent to the mobile devices 106, 108 such as by an in-app message, a text message, an email, and the like.

In these and some other embodiments, a mobile device app of one customer may operate passively as a beacon device. For example, when a location of the mobile device 106 is known in the backend system 114, the mobile device app may execute in the background to report identifiers included in received radio signals. The mobile device 106 location may be determined based on receipt of beacon device signals, GPS location from a GPS device of the mobile device, WAP signals, or even user input that is transmitted to the backend system. The received radio signals 110 are transmitted by other mobile devices, such as by a BLUETOOTH® transceiver of the mobile device 108 while the BLUETOOTH® functionality is turned on. These broadcast signals 110 typically include an identifier that is unique to the transceiver device, such as a MAC address. When the MAC address is associated with a customer account stored in the backend system, the mobile device 106 simply relaying received MAC addresses, and optionally a varying signal strength of the received signal including the MAC address, the backend system 114 is then aware of the approximate location of the customer of the customer account associated with the MAC address. Thus, mobile devices 106, 108 may be enabled to passively capture and relay data of received signals 110 to assist in a successful beacon device deployment.

Figure 2:
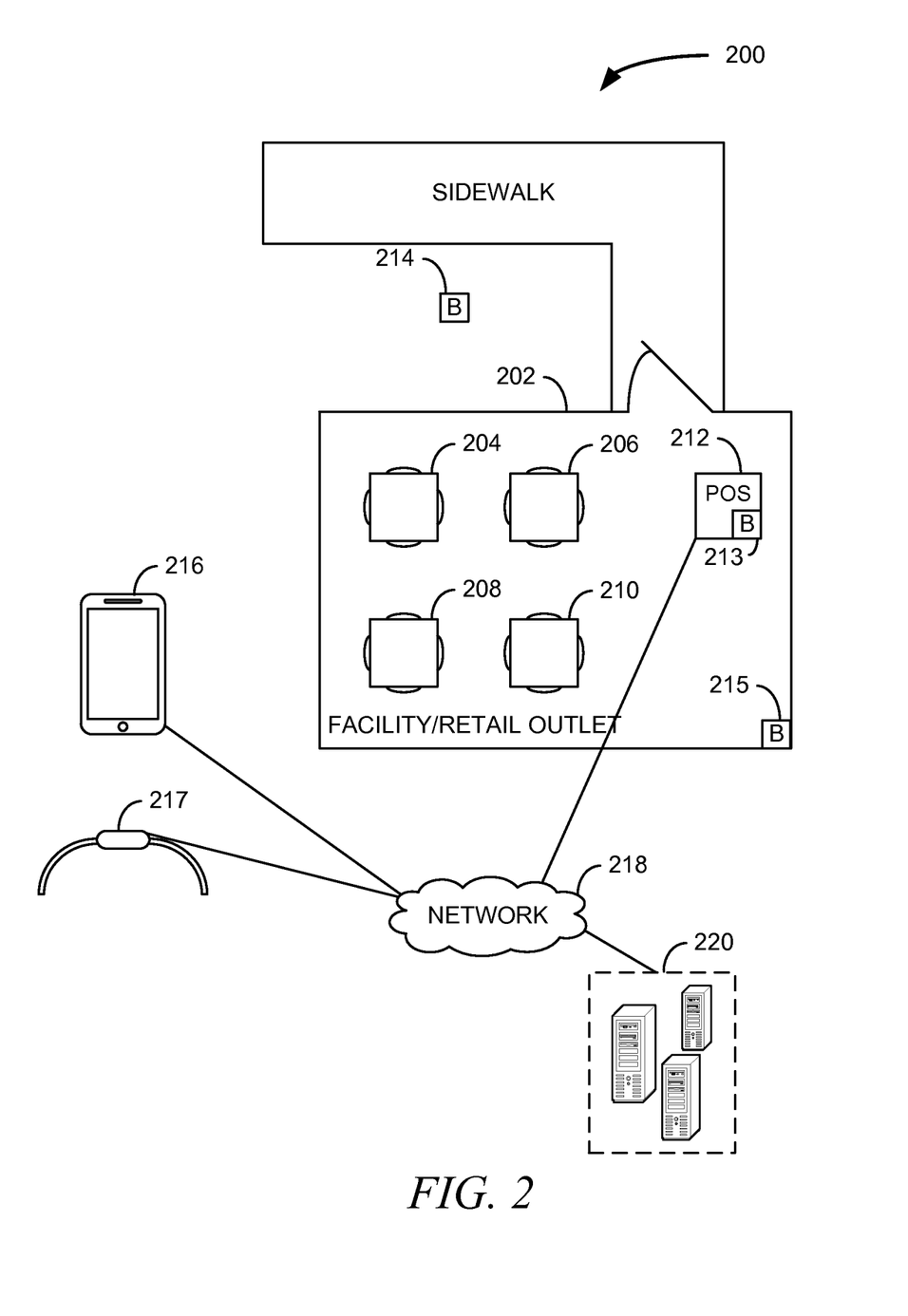
FIG. 2 is a logical block diagram of a system, according to an example embodiment.

FIG. 2 is a logical block diagram of a system 200, according to an example embodiment. The system 200 is illustrated as deployed with regard to a facility 202, such as a restaurant, although other embodiments may be deployed to other facility types, such as stores, concession stands, casinos, hospitals, and other facility types. The system 200 operates to utilize mobile devices as beacon devices.

In an example embodiment, a customer carrying a mobile device 216, 217, such as a smartphone, smartwatch, or tablet, may enter the facility 202. The customer mobile device 216, 217 typically includes a mobile device app that executes thereon that allows the customer to perform various actions, such as one or more of creating an account, adding and modifying payment account information, viewing and selecting items offered for sale at the facility 202, and to create an order therefore. Some embodiments of the mobile device 216, 217 app may perform additional actions such as viewing receipts of visits or interactions in the facility 202 or other facilities or access points (e.g., websites, kiosks, etc.), viewing a current bill, viewing a facility 202 map, viewing data of appointments and reservations, checking in at the facility with regard to an appointment or reservation, making a payment, and the like. The mobile device 216, 217 app, in some embodiments, receives data received by a transceiver device present on the mobile device 216, 217, such as one or both of a BLUETOOTH® device and a WI-FI® device. In some embodiments, data may also be received via a GPS device of the mobile device 216, 217. An example of data that may be received by the mobile device 216, 217 app is data from one or more beacon devices 213, 214, 215 deployed in and around the facility 202. The data from the one or more beacon devices 213, 214, 215 typically includes identifiers of the respective beacon devices. These beacon device identifiers enable the mobile device 216, 217 app or a backend system 220 service to determine a location of the mobile device. A beacon device identifier included in data transmitted from a mobile device 216, 217 may also trigger performance of one or more data processing activities configured in the backend system 220 with regard to a particular beacon device 213, 214, 215. The mobile device 216, 217, and the app thereon, may receive data from one of the beacon devices 213, 214, 215 or a plurality of beacon devices 213, 214, 215.

In some embodiments, a mobile device 216, 217 for which a location is known to the backend system 220, may operate as a beacon device for other mobile devices 216, 217. For example, a transceiver device of a mobile device 216, 217, such as a BLUETOOTH® transceiver, periodically broadcasts radio signals when the transceiver is enabled. These signals may be transmitted to determine what other devices may be present and available for connection. These signals typically include a unique identifier encoded therein, such as a MAC address of the transceiver. In some embodiments, a mobile device 216, 217 may receive such a signal and transmit the identifier and an account identifier of the user of the mobile device 216, 217 to the backend system 220 via network 218. A backend system 220 process may then query maintained customer account data that includes such identifiers stored in with or in association with customer accounts. This query is performed based on the identifier to determine if a location is known with regard to a mobile device of that identifier. When a location is known with regard to the identifier, a location of the mobile device 216, 217 from which the data was received is known to the backend system 220. The backend system 220 may then perform additional functions that may be triggered with regard to that location with regard to the particular customer account of the account identifier. Conversely, a mobile device 216, 217 may receive such a signal including a unique identifier from another mobile device 216, 217. The receiving mobile device 216, 217 may then relay the identifier to the backend system 220 and similar processing may occur.

Such embodiments enable a location of a mobile device 216, 217 located where beacon devices 213, 214, 216 are out of range, such as at table 208 to be located when another mobile device 216, 217 with proper functionality thereon is within range of both the remotely located mobile device 216, 217 and one or more of the beacon devices 213, 214, 216, such as when located at table 206.

Figure 3:
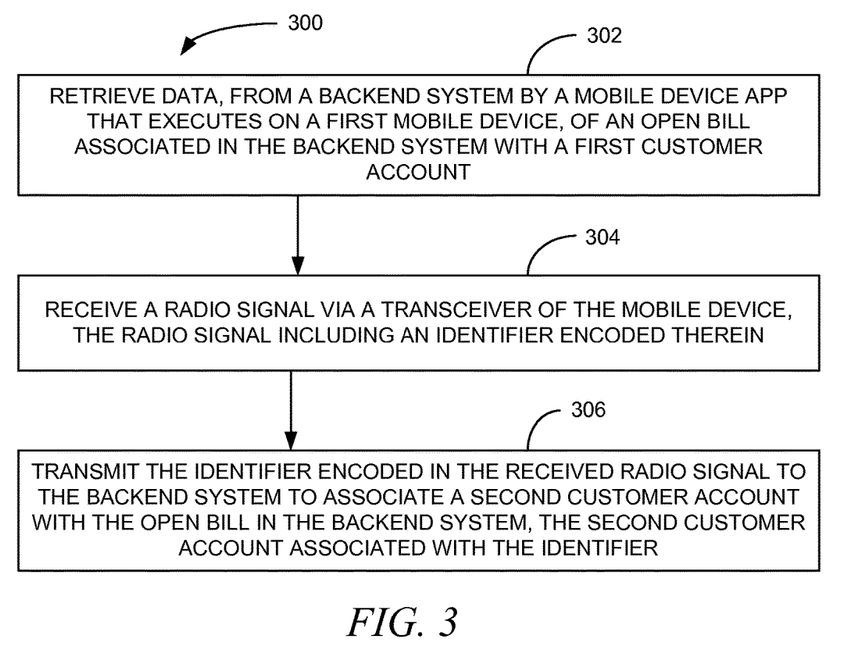
FIG. 3 is a logical block diagram of a method, according to an example embodiment.

FIG. 3 is a logical block diagram of a method 300, according to an example embodiment. FIG. 3 is an example of a method that may be performed on a mobile device, such as the mobile devices 106, 108 illustrated and described with regard to FIG. 1 and mobile devices 216, 217 illustrated and described with regard to FIG. 2.

The method 300 includes retrieving 302 data, from a backend system by a mobile device app that executes on a first mobile device, of an open bill associated in the backend system with a first customer account. The method 300 further includes receiving 304 a radio signal via a transceiver of the mobile device. The radio signal in such embodiments includes an identifier encoded therein. The method 300 also includes transmitting 306 the identifier encoded in the received radio signal to the backend system to associate a second customer account with the open bill in the backend system, the second customer account associated with the identifier.

In some such embodiments of the method 300, the backend system stores first and second customer account data. The first and second customer account data each includes a MAC address of a transceiver device of a mobile device. In further embodiments, the stored MAC addresses of each of the first and second customer account data are BLUETOOTH® transceiver MAC addresses of respective first and second customer mobile devices.

In some embodiments, the method 300 further includes the first mobile device receiving from the backend system and presenting on a display of the first mobile device a confirmation that the second customer account has been associated with the open bill. Such embodiments may further include receiving input within the mobile device app that executes on the first mobile device designating a portion of the open bill to be charged to a payment account associated with the first payment account in the backend system.

Another embodiment of the method 300 further includes receiving input of a code into the mobile device app that executes on the first mobile device to associate the first customer account with the open bill. The code may then be transmitted with identifying data of the first customer account to the backend system. In some embodiment, the code may be a barcode scanned by a camera of the first mobile device and decoded to obtain an alphanumeric code which is then transmitted to the backend system.

Yet another embodiment of the method 300 includes retrieving data of the open bill from the backend system and presenting a view of the open bill on a display of the first mobile device. Input designating one of a tip amount and a tip percent may then be received and data representative thereof may then be transmitted to the backend system to be associated with the open bill. The received input may also or alternatively include input designating the bill is to be paid automatically upon the mobile device departing a facility. The customer departure may be determined based on a determined location of the mobile device away from the facility, which may be made according to GPS data, reporting of a received beacon device signal outside of the facility, such as from the beacon device 214 of FIG. 2, and the like.

Figure 4:
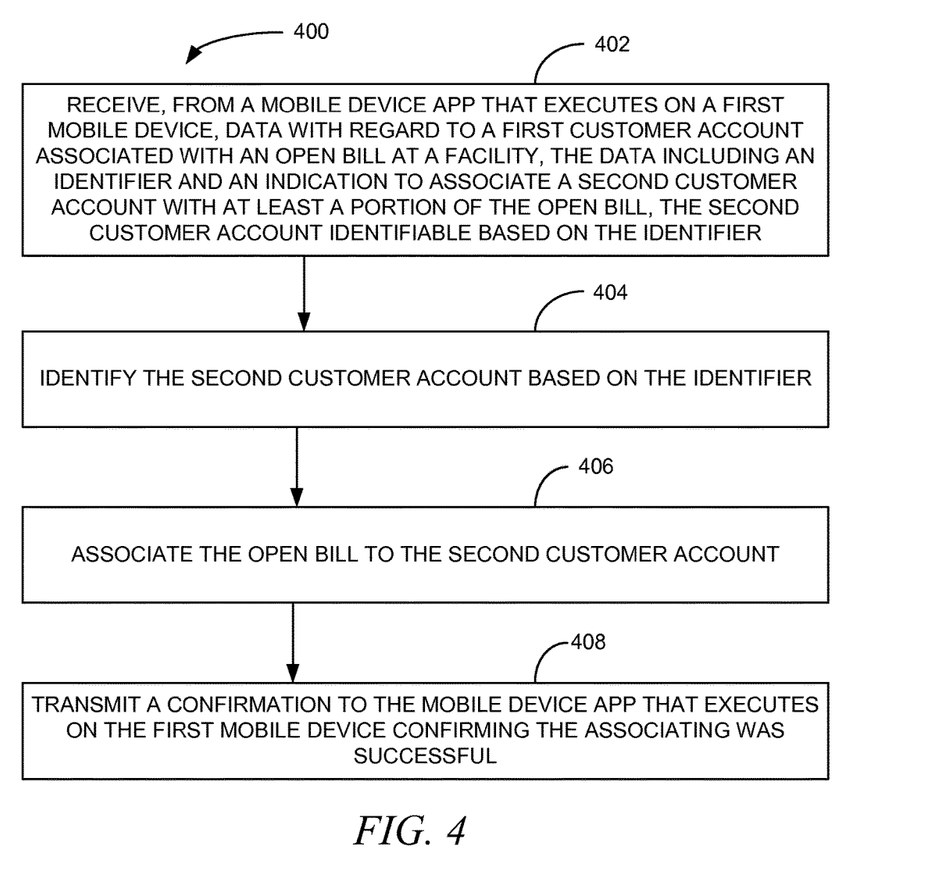
FIG. 4 is a logical block diagram of a method, according to an example embodiment.

FIG. 4 is a logical block diagram of a method 400, according to an example embodiment. The method 400 is an example of a method that may be performed on a backend system, such as the backend system 114 illustrated and described with regard to FIG. 1 and backend system 220 illustrated and described with regard to FIG. 2

The method 400 includes receiving 402, from a mobile device app that executes on a first mobile device, data with regard to a first customer account associated with an open bill at a facility. The received 402 data typically includes an identifier and an indication to associate a second customer account with at least a portion of the open bill. The second customer account is identifiable based on the identifier in such embodiments. The method 400 further includes identifying 404 the second customer account based on the identifier and associating 406 the open bill to the second customer account. The method 400, in some embodiments, may then transmit 408 a confirmation to the mobile device app that executes on the first mobile device confirming the associating was successful. A confirmation may also be transmitted to the second customer account confirming the association of the second customer account to the open bill.

In some embodiments of the method 400, the identifier included in the data received 402 from the mobile device app that executes on the first mobile device is a MAC address of a transceiver device of a second mobile device. In such embodiments, the MAC address of the second mobile device is stored as a portion of data of the second customer account.

Figure 5:
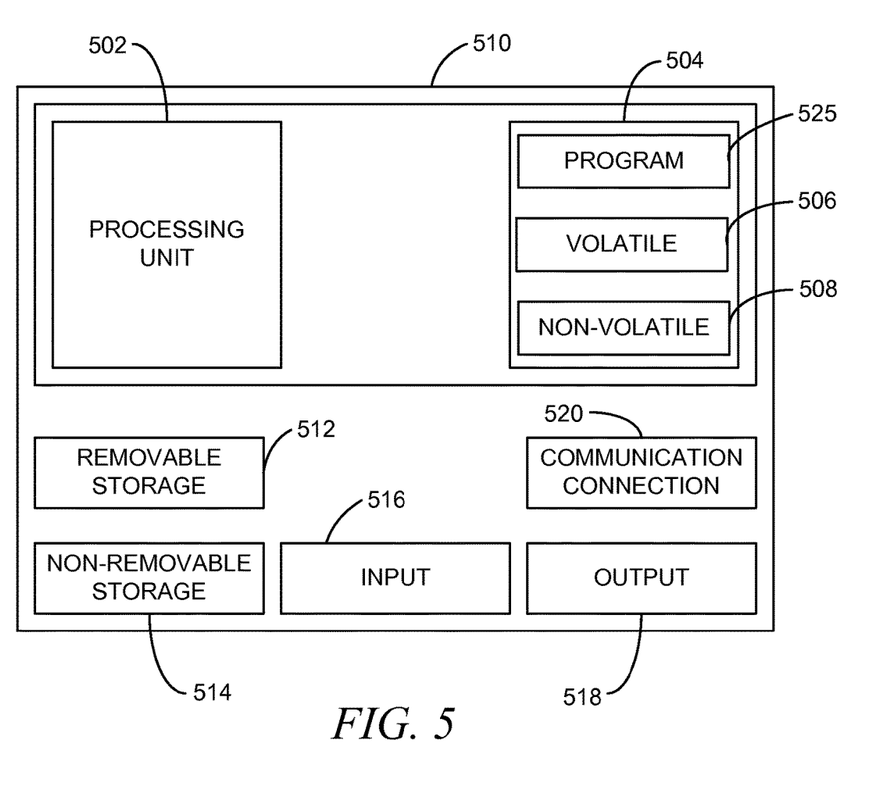
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

Another system embodiment includes at least one network interface device, a transceiver, at least one processor, and at least one memory. The at least one memory stores an instruction set that is executable by the at least one processor to perform data processing activities. The data processing activities include retrieving data via the at least one network interface device from a backend system of an open bill associated in the backend system with a first customer account. The data processing activities also include receiving a radio signal via the transceiver including an identifier encoded therein and transmitting, via the at least one network interface device, the identifier to the backend system to associate a second customer account with the open bill in the backend system, the second customer account associated with the identifier.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
retrieving data, from a backend system by a mobile device app that executes on a first mobile device, of an open bill associated in the backend system with a first customer account;
receiving a radio signal via a transceiver of the first mobile device, the radio signal including an identifier of a second mobile device encoded therein,
transmitting the identifier encoded in the received radio signal to the backend system to associate a second customer account with the open bill in the backend system, the second customer account associated with the identifier, wherein the backend system stores first and second customer account data, the first and second customer account data each including a Media Access Control (MAC) address of a transceiver device of the second mobile device, the identifier encoded in the radio signal being the MAC address included in the stored second customer account data;
receiving location identifying information by the mobile device app from the backend system identifying a location of the first mobile device within a facility, the backend system determining the location of the first mobile device based on a known location of the second mobile device determined by the backend system by a first beacon device identifier deployed at a location within the facility that the second device received and transmitted to the backend system but the first beacon device is out of range of the first mobile device;
receiving input by the mobile device app designating the bill is to be paid automatically upon the first mobile device departing the facility;
transmitting data representative of the received input to the backend system to be associated with the open bill;
wherein:
departure from the facility is determined based upon a determined location of the mobile device away from a location of the facility; and
the location away from the facility is determined based upon a signal received from a second beacon device deployed to a location outside of the facility.

2. The method of claim 1, wherein the stored MAC addresses of each of the first and second customer account data are BLUETOOTH® transceiver MAC addresses of respective first and second customer mobile devices.

3. The method of claim 1, further comprising:
receiving from the backend system and presenting on a display of the first mobile device confirmation that the second customer account has been associated with the open bill.

4. The method of claim 3, further comprising:
receiving input within the mobile device app that executes on the first mobile device designating a portion of the open bill to be charged to a payment account associated with the first payment account in the backend system.

5. The method of claim 1, further comprising:
receiving input of a code into the mobile device app that executes on the first mobile device to associate the first customer account with the open bill; and
transmitting the code and identifying data of the first customer account to the backend system.

6. The method of claim 5, wherein the code is received as input as an image captured by a camera of the first mobile device.

7. The method of claim 1, further comprising:
retrieving data of the open bill from the backend system and presenting a view of the open bill on a display of the first mobile device,
receiving a input designating one of a tip amount and a tip percent; and
transmitting data representative of the received input to the backend system to be associated with the open bill.

8. A method comprising:
receiving, from a mobile device app that executes on a first mobile device, data with regard to a first customer account associated with an open bill at a facility, the data including an identifier and an indication to associate a second customer account with at least a portion of the open bill, the second customer account identifiable based on the identifier, wherein the identifier included in the data received from the mobile device app that executes on the first mobile device is a Media Access Control (MAC) address of a transceiver device of a second mobile device;
identifying the second customer account based on the identifier;
associating the open bill to the second customer account,
transmitting a confirmation to the mobile device app that executes on the first mobile device confirming the associating was successful;
determining and storing a representation of a location of the first mobile device as within the facility based on a stored known location of the second mobile device determined by based on a first beacon device identifier of a first beacon device deployed at a location within the facility received from the second device, the first beacon device being out of range of the first mobile device;

receiving input from the mobile device app designating a portion of the bill associated with the first customer account to be paid automatically upon the first mobile device departing a facility;

receiving an indication of departure from the facility based upon a determined location of the first mobile device away from a location of the facility based upon a signal received from a second beacon device deployed to a location outside of the facility by the first mobile device; and charging the portion of the bill associated with the first customer account to the first customer account.

9. The method of claim 8, wherein the MAC address of the second mobile device is stored as a portion of data of the second customer account.

10. The method of claim 8, further comprising:

transmitting a confirmation to the second customer account confirming the association of the second customer account to the open bill.

11. The method of claim 10, wherein the confirmation to the second customer account is transmitted to a mobile device app that executes on a second mobile device of the second account holder.

* * * * *